United States Patent
Loveness et al.

(10) Patent No.: US 11,502,354 B1
(45) Date of Patent: Nov. 15, 2022

(54) DIRECTED QUENCH SYSTEMS AND COMPONENTS

(71) Applicant: Apple Inc., Cupertino, CA (US)

(72) Inventors: Ghyrn E. Loveness, Mountain View, CA (US); Abraham B. Caulk, San Jose, CA (US); Edward P. Yankoski, Los Gatos, CA (US); Zhongying Shi, Sunnyvale, CA (US); Kenneth S. Smith, Aurora, OR (US); Mujeeb I. Ijaz, Los Altos Hills, CA (US); Luke A. Wilhelm, Sausalito, CA (US); Jonathan L. Hall, Emerald Hills, CA (US)

( * ) Notice: Subject to any disclaimer, the term of this patent is extended or adjusted under 35 U.S.C. 154(b) by 0 days.

(21) Appl. No.: 17/175,270

(22) Filed: Feb. 12, 2021

Related U.S. Application Data

(62) Division of application No. 15/794,200, filed on Oct. 26, 2017, now Pat. No. 10,923,788.

(Continued)

(51) Int. Cl.
| | |
|---|---|
| *H01M 10/659* | (2014.01) |
| *H01M 10/613* | (2014.01) |
| *H01M 10/64* | (2014.01) |
| *H01M 10/6556* | (2014.01) |
| *F25J 1/00* | (2006.01) |
| *C21D 1/60* | (2006.01) |
| *F25J 1/02* | (2006.01) |
| *F28D 15/04* | (2006.01) |

(52) U.S. Cl.
CPC ............ *H01M 10/659* (2015.04); *C21D 1/60* (2013.01); *F25J 1/0052* (2013.01); *H01M 10/613* (2015.04); *H01M 10/64* (2015.04); *H01M 10/6556* (2015.04); *F25J 1/0291* (2013.01); *F28D 15/043* (2013.01)

(58) Field of Classification Search
CPC .. H01M 10/659; H01M 10/613; H01M 10/64; H01M 10/6556
See application file for complete search history.

(56) References Cited

U.S. PATENT DOCUMENTS

| | | |
|---|---|---|
| 3,053,435 A | 9/1962 | Sanders et al. |
| 6,278,259 B1 | 8/2001 | Kimoto et al. |
| (Continued) | | |

FOREIGN PATENT DOCUMENTS

| | | |
|---|---|---|
| CN | 2601463 Y | 1/2004 |
| CN | 101326657 A | 12/2008 |
| (Continued) | | |

OTHER PUBLICATIONS

U.S. Appl. No. 15/703,114, "Final Office Action", dated Mar. 16, 2020, 22 pages.

(Continued)

*Primary Examiner* — Jayne L Mershon
(74) *Attorney, Agent, or Firm* — Kilpatrick Townsend and Stockton, LLP

(57) ABSTRACT

Energy storage systems, battery cells, and batteries of the present technology may include a heat exchanger or fluid delivery structure that may transfer heat from a battery cell or cell block to a heat exchange fluid. The heat exchanger or fluid delivery structure may substantially maintain an interfacial temperature during a temperature increase from the battery cell or cell block.

14 Claims, 5 Drawing Sheets

Related U.S. Application Data

(60) Provisional application No. 62/428,160, filed on Nov. 30, 2016.

(56) References Cited

U.S. PATENT DOCUMENTS

| | | | |
|---|---|---|---|
| 8,956,747 | B2 | 2/2015 | Itoi et al. |
| 10,923,788 | B1 | 2/2021 | Loveness et al. |
| 11,296,380 | B2 | 4/2022 | Miler et al. |
| 11,296,381 | B2 | 4/2022 | Miler et al. |
| 2004/0069474 | A1 | 4/2004 | Wu et al. |
| 2006/0127765 | A1 | 6/2006 | Machida et al. |
| 2006/0172187 | A1 | 8/2006 | Ambrosio et al. |
| 2009/0274952 | A1 | 11/2009 | Wood et al. |
| 2009/0325054 | A1 | 12/2009 | Payne et al. |
| 2010/0055556 | A1 | 3/2010 | Meschter |
| 2010/0136391 | A1* | 6/2010 | Prilutsky ......... H01M 10/6564 429/62 |
| 2010/0279152 | A1 | 11/2010 | Payne |
| 2010/0316894 | A1 | 12/2010 | Hermann et al. |
| 2011/0020676 | A1 | 1/2011 | Kurosawa |
| 2011/0097620 | A1 | 4/2011 | Kim |
| 2011/0111273 | A1 | 5/2011 | Okada et al. |
| 2011/0135975 | A1 | 6/2011 | Fuhr et al. |
| 2011/0195284 | A1 | 8/2011 | Yasui et al. |
| 2012/0002338 | A1 | 1/2012 | Smith et al. |
| 2012/0082880 | A1 | 4/2012 | Koetting et al. |
| 2012/0148889 | A1 | 6/2012 | Fuhr et al. |
| 2012/0231306 | A1 | 9/2012 | Herron et al. |
| 2013/0034755 | A1 | 2/2013 | Kim |
| 2013/0078488 | A1 | 3/2013 | Nemoto et al. |
| 2013/0295428 | A1 | 11/2013 | Hatta et al. |
| 2013/0302664 | A1 | 11/2013 | Millon |
| 2014/0023906 | A1 | 1/2014 | Hashimoto et al. |
| 2014/0162107 | A1 | 6/2014 | Obrist et al. |
| 2014/0302368 | A1 | 10/2014 | Wang et al. |
| 2014/0318106 | A1 | 10/2014 | Mizuno et al. |
| 2014/0329121 | A1 | 11/2014 | Nishihara |
| 2014/0363720 | A1 | 12/2014 | Ackermann et al. |
| 2015/0194711 | A1* | 7/2015 | Rawlinson ......... B60H 1/00278 429/62 |
| 2015/0244036 | A1 | 8/2015 | Lane et al. |
| 2015/0280189 | A1 | 10/2015 | Ohshiba et al. |
| 2016/0020447 | A1 | 1/2016 | Janarthanam et al. |
| 2016/0093931 | A1* | 3/2016 | Rawlinson ......... H01M 10/625 429/72 |
| 2016/0099451 | A1 | 4/2016 | Murai et al. |
| 2016/0197385 | A1 | 7/2016 | Matsumoto et al. |
| 2016/0218336 | A1 | 7/2016 | Herrmann et al. |
| 2017/0162917 | A1 | 6/2017 | Yu et al. |
| 2018/0138473 | A1 | 5/2018 | Bessho et al. |
| 2019/0157729 | A1 | 5/2019 | Yamashita |
| 2019/0161909 | A1 | 5/2019 | Oikawa et al. |
| 2019/0267682 | A1 | 8/2019 | Seo et al. |
| 2020/0144576 | A1 | 5/2020 | Yoshida et al. |
| 2020/0220147 | A1 | 7/2020 | Haino et al. |

FOREIGN PATENT DOCUMENTS

| | | |
|---|---|---|
| CN | 101483227 A | 7/2009 |
| CN | 101523637 A | 9/2009 |
| CN | 101627490 A | 1/2010 |
| CN | 102007619 A | 4/2011 |
| CN | 102054951 A | 5/2011 |
| CN | 203871442 U | 10/2014 |
| CN | 204243106 U | 4/2015 |
| CN | 105518899 A | 4/2016 |
| CN | 205177921 U | 4/2016 |
| CN | 105742535 A | 7/2016 |
| CN | 105789507 A | 7/2016 |
| CN | 208585211 U | 3/2019 |
| DE | 102013015749 A1 | 3/2015 |
| DE | 102017118519 A1 | 2/2019 |
| EP | 1091438 A2 | 4/2001 |
| EP | 2262048 A1 | 12/2010 |
| EP | 2320493 A1 | 5/2011 |
| JP | 2011175844 A | 9/2011 |
| JP | 2015002166 A | 1/2015 |
| WO | 2011134815 A1 | 11/2011 |
| WO | 2011134828 A1 | 11/2011 |
| WO | 2017017913 A1 | 2/2017 |
| WO | 2018022964 A1 | 2/2018 |
| WO | 2018023050 A1 | 2/2018 |
| WO | 2018207608 A1 | 11/2018 |
| WO | 2020134054 A1 | 7/2020 |

OTHER PUBLICATIONS

U.S. Appl. No. 15/703,114, "Non-Final Office Action", dated Aug. 22, 2019, 15 pages.
U.S. Appl. No. 15/794,200, "Non-Final Office Action", dated Mar. 19, 2020, 10 pages.
U.S. Appl. No. 15/794,200, "Notice of Allowance", dated Oct. 29, 2020, 8 pages.
U.S. Appl. No. 15/885,126, "Final Office Action", dated Sep. 3, 2020, 14 pages.
U.S. Appl. No. 15/885,126, "Non-Final Office Action", dated Jan. 6, 2020, 20 pages.
U.S. Appl. No. 16/259,584, "Non-Final Office Action", dated Nov. 10, 2020, 16 pages.
Klambauer, et al., "cn.MOPS: Mixture of Poissons for Discovering Copy Number Variations in Next-Generation Sequencing Data with a Low False Discovery Rate", Nucleic Acids Research, vol. 40, No. 9, Feb. 1, 2012, pp. 1-14.
PCT/US2017/044316, "International Preliminary Report on Patentability", dated Feb. 7, 2019, 7 pages.
PCT/US2017/044316, "International Search Report and Written Opinion", dated Nov. 15, 2017, 10 pages.
PCT/US2017/044474, "International Preliminary Report on Patentability", dated Feb. 7, 2019, 8 pages.
PCT/US2017/044474, "International Search Report and Written Opinion", dated Oct. 24, 2017, 10 pages.
U.S. Appl. No. 16/259,584, "Final Office Action", dated Jun. 7, 2021, 13 pages.
U.S. Appl. No. 15/703,114, "Non-Final Office Action", dated Dec. 17, 2021, 24 pages.
U.S. Appl. No. 15/885,126, "Final Office Action", dated Jan. 6, 2022, 15 pages.
U.S. Appl. No. 16/259,440, "Notice of Allowability", dated Dec. 9, 2021, 2 pages.
U.S. Appl. No. 16/259,440, "Notice of Allowance", dated Dec. 1, 2021, 7 pages.
U.S. Appl. No. 16/259,584, "Notice of Allowance", dated Dec. 10, 2021, 12 pages.
U.S. Appl. No. 16/263,907, "Non-Final Office Action", dated Nov. 1, 2021, 11 pages.
U.S. Appl. No. 15/885,126, "Non-Final Office Action", dated Aug. 10, 2021, 15 pages.
China Patent Application No. 201910307710.1, "Office Action", dated Jul. 26, 2021, 17 pages.
China Patent Application No. 201910339097.1, "Office Action", dated Jun. 29, 2021, 12 pages.
U.S. Appl. No. 16/259,440, "Non-Final Office Action", dated Mar. 19, 2021, 12 pages.
U.S. Appl. No. 16/263,907, "Non-Final Office Action", dated Mar. 30, 2021, 12 pages.
U.S. Appl. No. 16/711,829, Non-Final Office Action, dated Feb. 4, 2022, 19 pages.
International Application No. PCT/US2021/053553, International Search Report and Written Opinion, dated Jan. 20, 2022, 12 pages.
Final Office Action issued in U.S. Appl. No. 15/703,114, dated Aug. 11, 2022 in 22 pages.
Advisory Action issued in U.S. Appl. No. 15/885,126, dated Apr. 15, 2022, 4 pages.
Notice of Allowance issued in U.S. Appl. No. 16/263,907, dated Jun. 1, 2022 in 8 pages.
Final Office Action issued in U.S. Appl. No. 16/711,829, dated Jul. 28, 2022 in 24 pages.

(56) References Cited

OTHER PUBLICATIONS

Office Action issued in China Application No. CN201910307710.1, dated Mar. 2, 2022 in 20 pages.
Office Action issued in China Application No. CN201910339097.1, dated Jun. 24, 2022 in 10 pages.
Office Action issued in China Application No. CN201910339097.1, dated Apr. 12, 2022 in 17 pages.
U.S. Appl. No. 16/263,907, "Corrected Notice of Allowability", dated Sep. 9, 2022, 2 pages.
U.S. Appl. No. 16/711,829, "Final Office Action", Aug. 11, 2022, 24 pages,.
U.S. Appl. No. 15/703,114, Final Office Action, Aug. 11, 2022, 22 pages.

* cited by examiner

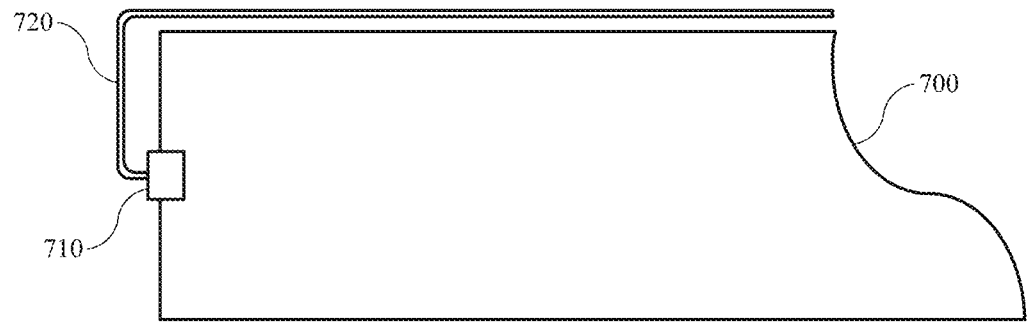
*FIG. 7A*
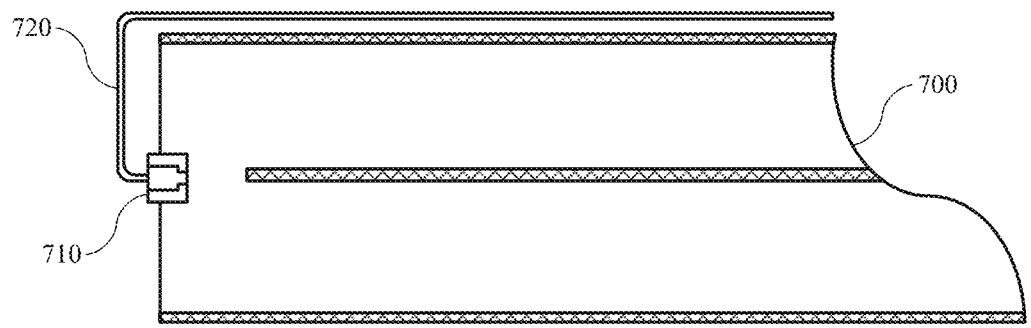
*FIG. 7B*
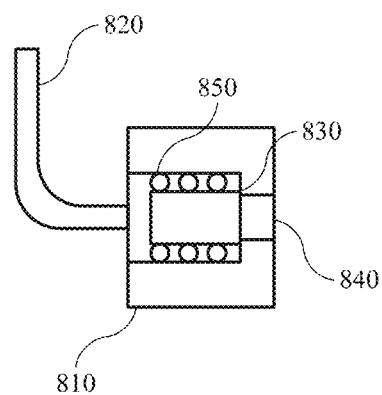 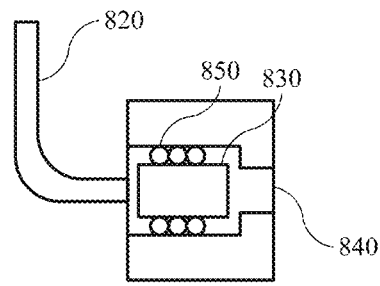
*FIG. 8A*            *FIG. 8B*

DIRECTED QUENCH SYSTEMS AND COMPONENTS

CROSS REFERENCE TO RELATED APPLICATION

The application is a divisional of U.S. application Ser. No. 15/794,200 filed Oct. 26, 2017, which claims the benefit of U.S. Application Ser. No. 62/428,160 filed Nov. 30, 2016, the disclosures of which are hereby incorporated by reference in their entirety for all purposes.

TECHNICAL FIELD

The present technology relates to heat transfer systems and components. More specifically, the present technology relates to heat transfer systems for energy storage devices.

BACKGROUND

In battery-powered devices, heat transfer between batteries or between battery cell blocks may cause performance degradation or may lead to device failure. Although insulation materials may assist with limiting heat transfer between cell blocks, the amount of insulation may increase the overall size of the device or reduce the amount of available space for battery cells. Improved designs are needed.

SUMMARY

The present technology relates to energy storage devices and systems, including battery cells, battery cell blocks, and batteries, which may include lithium-ion batteries. These systems may include heat exchangers, or heat exchange devices that may limit heat transfer from a particular cell block. The heat exchange devices may include many different features, designs, and material configurations as will be described throughout the disclosure.

Energy storage systems, battery cells, and batteries of the present technology may include a cell block including a plurality of battery cells. The systems may include a fluid delivery manifold coupled with a sidewall of the cell block. The fluid delivery manifold may be configured to distribute a fluid within the fluid delivery manifold. The fluid delivery manifold may be in thermal communication with the cell block, and may be configured to receive heat from the cell block to the fluid within the fluid delivery manifold. The fluid delivery manifold may include a fluid entry port configured to receive a liquid. The fluid delivery manifold may define a fluid path within the fluid delivery manifold configured to at least partially contain the liquid within the fluid delivery manifold while providing egress to vaporized liquid from at least one exit channel defined from the fluid delivery manifold.

The fluid delivery manifold may be configured to maintain at least a portion of fluid flow within the fluid delivery manifold during an expansion of a battery cell of the plurality of battery cells. The fluid delivery manifold may also be configured to withstand a compressive force greater than about 200 kPa. The fluid delivery manifold, while receiving a fluid, may be configured to maintain a temperature profile across the manifold below a threshold temperature for a period of time greater than 5 minutes. In some embodiments, the threshold temperature may be less than about 130° C. The fluid entry port may be located at a top of the fluid delivery manifold, and the at least one exit channel may be located along a sidewall of the fluid delivery manifold. The fluid delivery manifold may be characterized by a thickness less than about 1 cm in embodiments. The fluid delivery manifold may be coupled with a first side of the cell block, and a second fluid delivery manifold may be coupled with a second side of the cell block opposite the first side of the cell block. In some embodiments, the fluid delivery manifold may be configured to fluidly isolate the plurality of cells from the liquid received by the fluid delivery manifold.

The present technology also encompasses energy storage systems. The systems may include a cell block including a plurality of battery cells, and the cell block may be characterized by a top and sides. The systems may also include a structure coupled with the cell block at the top of the cell block and at least one side of the cell block, and the structure may be configured to distribute a fluid substantially uniformly through the structure from a fluid port.

In some embodiments the structure may include an ordered or unordered mesh or a pleated arrangement of material. The structure may be a continuous arrangement extending across the top and at least one side of the cell block. The structure may be configured to conduct liquid through the structure at a rate greater than or about 50 mL/min. The structure may be configured to maintain a substantially uniform fluid distribution through the structure under a compressive force greater than about 100 kPa. In some embodiments the structure may include a metal, a fabric, or a polymer. The structure may include a material configured to withstand temperatures greater than about 100° C. In embodiments the energy storage system may further include a housing containing the cell block and the structure. The structure may include a material sheet extending continuously over a first side of the cell block, across the top of the cell block, and over a second side of the cell block opposite the first side of the cell block.

The present technology also encompasses energy storage systems. Exemplary systems may include a cell block having at least one battery cell. The systems may include a heat exchanger coupled with a surface of the cell block. The heat exchanger may be configured to circulate a heat exchange fluid proximate the surface of the cell block to receive a heat load from the cell. The heat exchanger may be configured to reject the heat load from the heat exchange fluid at a secondary heat exchange position. Also, the heat exchanger may operate at a first fluid pressure. The systems may include a distribution assembly, which may include a valve incorporated with the heat exchanger. The distribution assembly may also include piping coupled with the valve and extending to an entrance port at the cell block.

In some embodiments the valve may include a pressure-release valve configured to open at a threshold pressure and allow the heat exchange fluid to flow into the piping. The first pressure may be or include a pressure range from about atmospheric pressure to the threshold pressure. The entrance port may include a heat-sensitive plug configured to release at a threshold temperature associated with the threshold pressure. The cell block may include a housing containing the at least one battery cell and a fluid delivery apparatus fluidly coupled with the entrance port. The fluid delivery apparatus may include a manifold or a structure configured to distribute a fluid substantially uniformly through the structure from the entrance port. In some embodiments the energy storage system may include an array of cell blocks including a first cell block having a first surface coupled with the heat exchanger. The system may also include a second heat exchanger coupled with a second surface of the cell block opposite the first surface of the cell block. The system may also include a thermal interface material positioned between the surface of the cell block and the heat exchanger.

Such technology may provide numerous benefits over conventional technology. For example, the present devices may reduce insulation requirements by providing a heat transfer medium by which heat may be removed from the system. Additionally, the designs may allow extended scaling of batteries for use in larger devices and systems based on their reduced footprint. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

FIG. 7A shows an exemplary partial view of a heat exchanger and distribution assembly according to embodiments of the present technology.

FIG. 7B shows an exemplary partial cross-sectional view of a heat exchanger and distribution assembly according to embodiments of the present technology.

FIG. 8A shows an exemplary expanded cross-sectional view of a distribution assembly according to embodiments of the present technology.

FIG. 8B shows an exemplary expanded cross-sectional view of a distribution assembly according to embodiments of the present technology.

Figure 1:
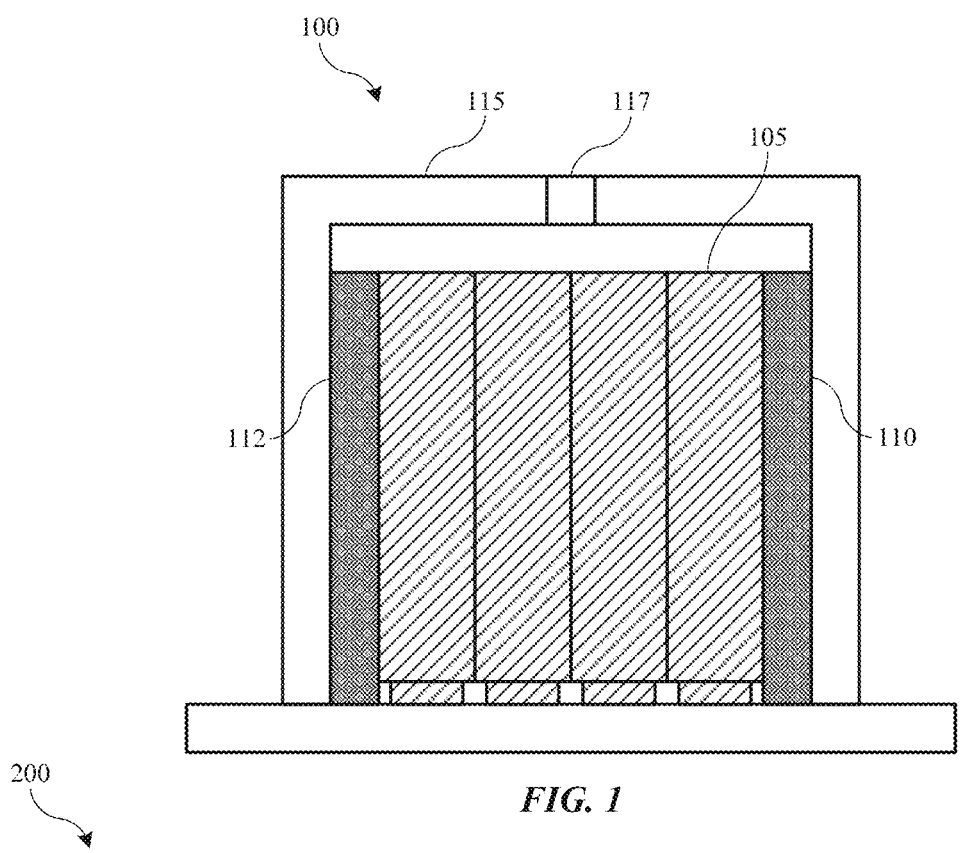
FIG. 1 shows an exemplary schematic cross-sectional view of an energy storage system according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include additional or exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Energy storage devices and systems may include multiple batteries or battery cell blocks, as well as associated components. Heat generation often occurs during operation of battery systems, and this heat can transfer from one battery cell or cell block to another. The heat generated may be due in part to issues with a particular cell, and this heat may produce or lead to device failure. The heat generated may also spread to adjacent cells, as well as adjacent cell blocks, which may cause additional device failure. In order to limit heat effects from one cell block to another, systems may be developed to reduce or limit the impact of heat produced by one or more cells.

Conventional systems may separate cells with additional components to minimize heat impact from one cell to another. Additionally, insulation may be placed between cells or between cell blocks for the same purpose. Depending on the type of issue or fault from a particular cell or cell block, the heat generated may be large, and may have associated temperatures that are well over 300° C. or higher. The amount of insulative material may have an impact on the overall system design. For example, sufficient insulation may require much larger energy storage arrays, which may result in much larger end devices. Alternatively, in designs in which space for the energy system is defined, the number of cells in the overall array may be reduced to provide sufficient insulation between cells or cell blocks.

The present technology, however, may utilize heat exchangers and heat transfer systems, which may reduce the amount of insulation used for an overall array. By utilizing the heat capacity of a fluid under phase change conditions, large amounts of heat may be removed from the system. Additionally, by utilizing a flowing fluid, generated heat may be drawn and rejected from the system without the system structures fully absorbing the generated heat. This may allow more compact energy storage arrays to be utilized.

Although the remaining portions of the description will routinely reference lithium-ion batteries, it will be readily understood by the skilled artisan that the technology is not so limited. The present designs may be employed with any number of battery or energy storage devices, including other rechargeable battery types as well as non-rechargeable designs. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air-travel equipment, and space-travel equipment, as well as any other device that may use batteries or benefit from the discussed designs. Accordingly, the disclosure and claims are not to be considered limited to any particular example discussed, but can broadly be utilized with any number of devices that may exhibit some or all of the electrical, thermal, or chemical characteristics of the discussed examples. For example, many of the components, arrangements, and systems of the present technology may be utilized in any apparatus or system in which heat generation or removal may occur or be desired.

FIG. 1 shows a schematic cross-sectional view of an energy storage system 100 according to embodiments of the present technology. Energy storage system 100 may include a cell block 105, which may be one or more battery cells. Cell block 105 is illustrated as including four batteries or battery cells, although it is to be understood that any number of batteries or battery cells greater or smaller than illustrated may be included as cell block 105. The battery cells of cell block 105 may be coupled in series or in parallel, and may be used to provide energy to an apparatus or system in which cell block 105 is included. Although illustrated in a particular vertical orientation, it is to be understood that the cells within cell block 105 may be flipped vertically, or may be in any other orientation within the cell block. Similarly, in any of the other figures discussed elsewhere in this application, it is to be understood that the individual cells may be included in any orientation within the cell block. In some embodiments, the cell terminals may be directed away from the entrance as illustrated, such as facing a base or bottom of the cell block. Under normal operation, cell block 105, as well as the individual cells, may produce heat. Additionally, during a fault condition, as a cell degrades, due to imbalance of the cells of cell block 105, or based on a number of other conditions known in the art, heat may be produced beyond the normal operating conditions of the cell block. This heat may cause structural damage to any of the plurality of battery cells of the cell block 105, as well as to the cell block itself, and may transfer generated heat to surrounding components. Surrounding components may include other cell blocks as well as other system components of the device in which the cell block 105 is included. These components may be sensitive to heat, and the heat generated may pose issues if allowed to continue unabated.

Energy storage system 100 may also include a fluid delivery manifold 110. Fluid delivery manifold 110 may be coupled with the cell block 105, or may be in thermal communication with the cell block. For example, fluid delivery manifold 110 may be directly contacting cell block 105, or may have one or more materials positioned between the fluid delivery manifold and the cell block. These materials may be or include cell block walls or enclosures, thermal interface materials, or other components that may be incorporated within an energy storage system. The fluid delivery manifold 110 may be configured to transfer heat from the cell block 105 under certain conditions. These conditions may include normal operating conditions, although in embodiments these conditions may be when the system senses conditions outside of design conditions. These conditions may be sensed in any number of ways including by sensors, such as thermal, electrical, pressure, mechanical, or other sensors positioned within or about the cell block 105, or associated with energy storage system 100.

Fluid delivery manifold 110 may allow transfer of heat from the cell block 105 to a fluid within the fluid delivery manifold. The fluid delivery manifold 110 may be configured to distribute the fluid within the fluid delivery manifold, or the fluid delivery manifold may maintain an amount of fluid within the fluid delivery manifold at all times or during event conditions. The heat transfer may occur conductively from cell block 105 to fluid delivery manifold 110, or through walls of the fluid delivery manifold to the fluid contained or distributed therein. In some embodiments, the fluid delivery manifold 110 may fluidly isolate the plurality of cells of the cell block 105 from the liquid received or contained within the fluid delivery manifold. Because the cells may be active battery cells, which may include electrochemical reactions, maintaining a fluidic barrier between the cell block 105 and the fluid delivery manifold 110 may reduce short circuiting or other effects of fluid contact with the plurality of cells.

In some embodiments, the energy storage system 100 may include a single fluid delivery manifold 110. In other embodiments, fluid delivery manifold 110 may be coupled with a first side of the cell block 105, and a second fluid delivery manifold 112 may be coupled with a second side of cell block 105 that is opposite the first side of the cell block. This configuration may allow additional temperature distribution control from the energy storage system 100. By providing a fluid delivery manifold 112 in conjunction with fluid delivery manifold 110, heat distribution from energy storage system 100 may be reduced or limited from multiple directions.

Additionally, although not illustrated, fluid delivery manifolds may be positioned along each side of cell block 105, such as all four sides of a rectangular cell block. Additionally, although not illustrated, the fluid delivery manifolds may have additional shapes, such as an L-shape, a T-shape, an E-shape, an open square shape, a multi-sided box shape, such as a five-sided box, or any other shape or geometry that may allow the manifold to fit about or along one or more sides, top, and/or bottom of the cell block 105, or multiple cell blocks 105. Depending on the system configuration, more or less fluid distribution manifolds may be used. For example, if one or more sides of cell block 105 were adjacent a different heat sink structure, or a device that may be inert to temperature increases, a fluid distribution manifold may not be utilized in that position. It is to be understood that energy storage system 100 may also or alternatively include insulation in either position denoted by fluid distribution manifolds 110, 112. For example, in a design including a single fluid distribution manifold 110, fluid distribution manifold 112 may alternatively be an insulative material configured to limit heat transfer from the cell block 105.

Energy storage system 100 may include additional components in some embodiments. For example, energy storage system 100 may include housing 115, which may enclose or include cell block 105 as well as fluid delivery manifolds 110, 112. Housing 115 may define an entrance 117 in which fluid may be provided for distribution through fluid delivery manifolds 110, 112. Although not illustrated, piping, sloped housing, or other structures internal to the housing 115 may deliver the fluid from the entrance 117 to the fluid delivery manifolds 110, 112. In other embodiments, housing 115 may not include fluid delivery manifolds 110, 112 within the structure. For example, housing 115 may be adjacent cell block 105 on one or more sides, including on all sides. Fluid delivery manifolds 110, 112 may be positioned external to the housing 115, and may directly contact housing 115, or be separated by an interface material or other materials. Such a configuration may allow direct piping or delivery of fluid to the individual fluid delivery manifolds 110, 112, and may reduce the complexity of distribution within the housing 115. Additionally, by locating the fluid delivery manifolds 110, 112 external to the housing 115, further fluid separation may be provided between the cell block 105 and the fluid delivery manifolds 110, 112.

Figure 2:
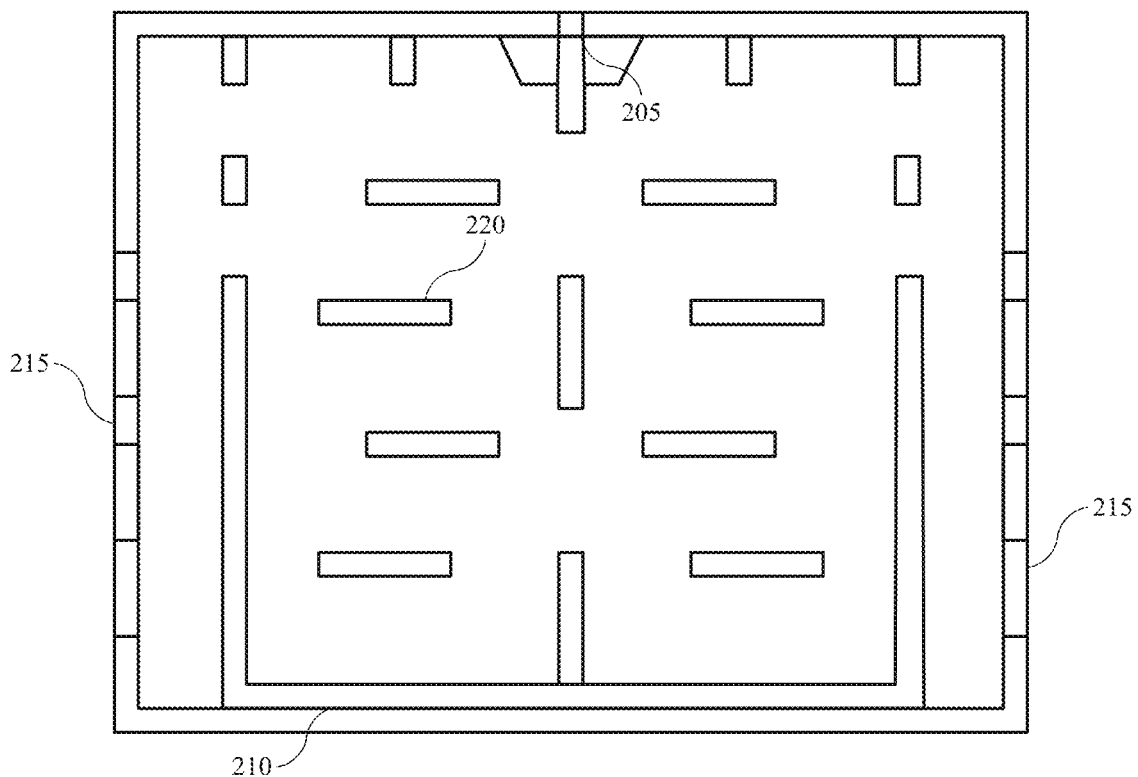
FIG. 2 shows an exemplary schematic cross-sectional view of a fluid delivery manifold according to embodiments of the present technology.

Turning to FIG. 2 is shown a schematic cross-sectional view of a fluid delivery manifold 200 according to embodiments of the present technology. Fluid delivery manifold 200 may be included in energy storage system 100, and may illustrate additional features of the energy storage system. Fluid delivery manifold 200 may be the same as or include similar features as fluid delivery manifolds 110, 112 previously discussed. Fluid delivery manifold 200 may include or define a fluid entry port 205 within the structure. Fluid delivery port 205 may be configured to receive a liquid in some embodiments. Fluid delivery manifold 200 may also define a fluid path within the fluid delivery manifold. The fluid delivery manifold 200 may be configured to at least partially contain the liquid delivered into the fluid delivery manifold within the structure.

As illustrated, fluid delivery manifold 200 may include a reservoir 210, which may be a portion of the fluid delivery manifold, or a structure defined within the fluid delivery manifold. Reservoir 210 may allow liquid flowed into the structure to absorb heat being transferred from a cell block. Depending on the flow rate through the fluid delivery manifold 200, a direct path through the fluid delivery manifold may limit the amount of heat absorbed by any unit of liquid. The following example may further aid understanding of certain aspects of the present technology.

During an event that may cause one or more battery cells to produce excessive heat, the heat generated may be sufficient to cause thermal runaway of the particular cell, which may be an exothermic event. The generated heat may raise the temperature of the cell by several hundred degrees, which may cause surrounding cells to overheat, which in turn may propagate thermal runaway in surrounding cells. In a cell block including four cells, for example, any one cell achieving thermal runaway may cause each adjacent cell to enter thermal runaway, and may eventually cause every cell to breakdown. If the cell block is included within an array of cell blocks, the heat transfer may continue to adjacent cell blocks causing the cells included within the adjacent cell blocks to enter thermal runaway, and so on through the entire energy storage system. Although insulation may reduce or limit the effect from one cell block to another, the present technology may provide additional benefits. Instead of only containing the heat in a manner similar to insulation, the present technology may absorb and transfer the heat generated out from the system. This may occur via the fluid delivered to the fluid delivery manifold, for example.

Upon sensing an event determined to benefit from the heat transfer capabilities of the present technology, a system may trigger fluid delivery to the fluid delivery manifold 200. In one non-limiting example, water may be the fluid delivered, although it is to be understood that any fluid or combination of fluids may be provided that may absorb heat from a cell block. The water may be precooled, or may be at any temperature below the boiling point of the water or combination fluid at the conditions at which it is delivered. For example, depending on where the water or fluid is stored within the system, the water or fluid may already be at an elevated temperature from atmospheric conditions, although the fluid may be below or well below the boiling point of the water or fluid and any elevated temperatures of a thermal event.

The water or fluid may be delivered to the fluid entry port 205 of fluid delivery manifold 200, and may distribute down, for example, into reservoir 210. As the water or fluid absorbs heat, it may reach the vapor transition temperature of the water or fluid. At this stage, the water or fluid may continue to absorb heat isothermally as the water or fluid undergoes a phase transition from liquid to vapor. This may allow a greater amount of heat to be absorbed, while maintaining the temperature of the fluid at the boiling point. As a result, neighboring cells, cell blocks, and other structures may be maintained at or below the boiling point of the fluid as well, which may allow the structures to be insulated from the temperature or conditions of the cell block undergoing a thermal event. Once vaporized, the delivered water or fluid may flow from the reservoir 210 through the fluid delivery manifold 200 toward exit channels 215. Such a reservoir 210 and fluid path to exit channels 215 may allow the fluid delivery manifold to contain the liquid within the manifold as it absorbs heat and boils, while providing egress to vaporized liquid through the exit channels 215. Exit channels 215 may be defined from the fluid delivery manifold 200, or may be apertures or exit ports that provide access from the fluid delivery manifold 200 to outlets from the cell block or structure in which the fluid delivery manifold is included. While the fluid entry port 205 may be positioned or defined at the top of the fluid delivery manifold, the at least one exit channel 215 may be located along a wall of the fluid delivery manifold.

The fluid delivery manifold may also have a number of exit channels positioned in or defined by the fluid delivery manifold, and may have an equal number of such exit channels 215 on each side of the fluid delivery manifold. For example, on each side of the fluid delivery manifold may be 1 exit channel, 2 exit channels, 3 exit channels, 4 exit channels, 5 exit channels, or more. In some embodiments the fluid distribution may not rely on evaporation, and fluid that has received an amount of heat may flow out of the fluid delivery manifold as additional fluid is delivered. The distribution channels within the fluid delivery manifold may be positioned to utilize convective flow of the fluid such that while newer fluid is delivered to the fluid delivery manifold, fluid that has received heat may rise and flow out from reservoir 210 and out one or more exit channels 215.

By utilizing a fluid that may undergo a phase transition, the temperature within the fluid delivery manifold 200 may be effectively pinned or maintained at the phase transition temperature. While the heat is continued to be absorbed from the cell block, the temperature at or within the fluid delivery manifold may be maintained or substantially maintained. This may allow adjacent structures to operate normally, or within normal ranges, while a particular cell block exceeds standard temperature conditions. For example, during thermal runaway, the temperature within or leaving the cell block may be up to or greater than about 100° C., and may be greater than or about 200° C., greater than or about 300° C., greater than or about 400° C., greater than or about 500° C., or higher depending on the conditions of the fault. The heat generated at these temperatures may be absorbed by the water or fluid undergoing a phase transition, however, which in the case of water will occur isothermally at 100° C. Accordingly, while at least some liquid water is still present within the fluid delivery manifold, the temperature may not exceed about 130° C., may not exceed about 120° C., may not exceed about 110° C., may not exceed about 100° C., may not exceed about 90° C., or less, depending on the amount of water or fluid included in the fluid delivery manifold and the temperature at which it evaporates or undergoes a phase change.

During events such as thermal runaway, for example, individual cells or the cell block may expand from gassing produced by the exothermic reactions within the battery cell. This may produce a force within the cell block compressing additional components that may be within the structure, such as housing 115 discussed previously. In embodiments in which the fluid delivery manifold 200 may be included within the housing, the force produced may act compressively on the fluid manifold. Depending on the extent of the force produced, the rigidity of the housing in which the components are included, and other factors, an expanding cell may at least partially compress portions of the fluid delivery manifold 200. In embodiments, the fluid delivery manifold 200 may be configured to maintain at least a portion of fluid flow within the fluid delivery manifold 200 during expansion of a battery cell of the plurality of battery cells that may compose a cell block. Fluid delivery manifold 200 may include a plurality of supports 220 distributed about the fluid delivery manifold. These supports 220 may act to provide structural rigidity to the fluid delivery manifold, and may also assist with fluid delivery within the fluid delivery manifold.

For example, portions of reservoir 210 additionally may provide support to the fluid delivery manifold along with other horizontally, angled, and/or vertically distributed support members. The supports 220 may be distributed within the fluid delivery manifold 200 to limit the amount of compression at any particular location. By providing regions that may withstand an amount of compressive force, at least some fluid delivery throughout the fluid delivery manifold may be maintained during an event. Additionally, the materials and construction of the fluid delivery manifold may further contribute to the ability to withstand a compressive force. For example, the fluid delivery manifold 200 may be made of a metal or composite.

Additionally, the fluid delivery manifold may be made of or include an electrically insulative material or a thermally conductive material that may assist with the transfer of heat from a cell block to a distributed fluid within the fluid delivery manifold, while maintaining structural integrity against a compressive force. In embodiments the fluid delivery manifold 200 may be configured to or characterized by an ability to withstand a compressive force greater than about 200 kPa. The fluid delivery manifold may also be configured to withstand a compressive force greater than or about 300 kPa, greater than or about 400 kPa, greater than or about 500 kPa, greater than or about 600 kPa, greater than or about 700 kPa, greater than or about 800 kPa, greater than or about 900 kPa, greater than or about 1000 kPa, or greater.

An event that may trigger excessive heat production or transfer across the fluid delivery manifold may continue over a period of time. For example, a battery cell in which material breakdown is occurring may continue to produce reactions at high temperature for a period of time that may last seconds, minutes, or more depending on the amount of material within the cell and the event occurring. As this heat transfers to neighbor cells, such as within the same cell block, a similar reaction may begin to occur, which may in turn continue through each cell of the block. In embodiments of the present technology, the fluid delivery manifold 200 may be configured to receive a stream of fluid, or discreet amounts of fluid over a period of time.

For example, in embodiments in which the fluid is water or an aqueous mixture or solution, the fluid delivery manifold may receive amounts of the fluid over a period of time, and the fluid delivery manifold may be configured, with this fluid, to maintain a temperature profile across the manifold below a threshold temperature for a period of time up to or greater than about 2 minutes, and may be configured to maintain a temperature profile across the manifold below a threshold temperature for a period of time up to, greater than, or about 5 minutes, greater than or about 7 minutes, greater than or about 9 minutes, greater than or about 11 minutes, greater than or about 13 minutes, greater than or about 15 minutes, greater than or about 18 minutes, greater than or about 20 minutes, greater than or about 22 minutes, greater than or about 24 minutes, greater than or about 26 minutes, greater than or about 28 minutes, greater than or about 30 minutes, greater than or about 40 minutes, greater than or about 50 minutes, greater than or about 1 hour, or more depending on the amount of heat to be transferred from a cell block or heat-generating structure. Additionally, the amount of time at which the fluid delivery manifold may maintain the temperature profile may be based on the amount of fluid within a reservoir, the amount of potential release heat from a cell block or heat-generating structure, some combination of the two, as well as other variables.

The temperature profile discussed above may be a temperature profile across a thickness of the fluid delivery manifold. For example, a surface of the fluid delivery manifold contacting a cell block or other heat-releasing material may experience any of the temperatures discussed elsewhere in this disclosure, which may be several hundred degrees. A fluid within the fluid delivery manifold may receive and transfer this heat out of the system such that a temperature of a surface of the fluid delivery manifold opposite the surface contacting the cell block may remain at a lower temperature or below a threshold temperature. For example, while the surface in contact with a cell block may reach temperatures of several hundred degrees, a surface opposite that surface as well as a material or structure contacting the surface opposite the surface contacting or in thermal communication with the cell block may remain below or about a threshold temperature of 200° C., and may remain or be maintained below or about 175° C., below or about 150° C., below or about 140° C., below or about 130° C., below or about 120° C., below or about 110° C., below or about 100° C., below or about 90° C., or lower.

The fluid delivery manifold 200 may be characterized by any size depending on the system in which it is disposed, the amount of heat it is to remove, the amount of fluid flow it may receive, and any other number of variables. In some embodiments in which the fluid delivery manifold is disposed within or adjacent a cell block having a plurality of battery cells and overall length and width dimensions around 30-50 cm or less, the fluid delivery manifold may be characterized by a thickness of less than or about 1 cm in embodiments, and may be characterized by similar length and width dimensions of the cell block or one or more cells within the block. Additionally, the fluid delivery manifold may be characterized by a thickness of less than or about 9 mm, less than or about 8 mm, less than or about 7 mm, less than or about 6 mm, less than or about 5 mm, less than or about 4 mm, less than or about 3 mm, less than or about 2 mm, less than or about 1 mm, or less in embodiments. By utilizing a fluid that may undergo a phase transition to remove heat from the cell block, the fluid delivery manifold may be characterized by a smaller thickness than, for example, an amount of insulation to reduce or limit heat propagation to surrounding structures. Accordingly, for a given space for an energy storage device, more of the area may be occupied by cells or cell blocks with the present technology, which may increase the overall available energy capacity from the system.

Figure 3A:
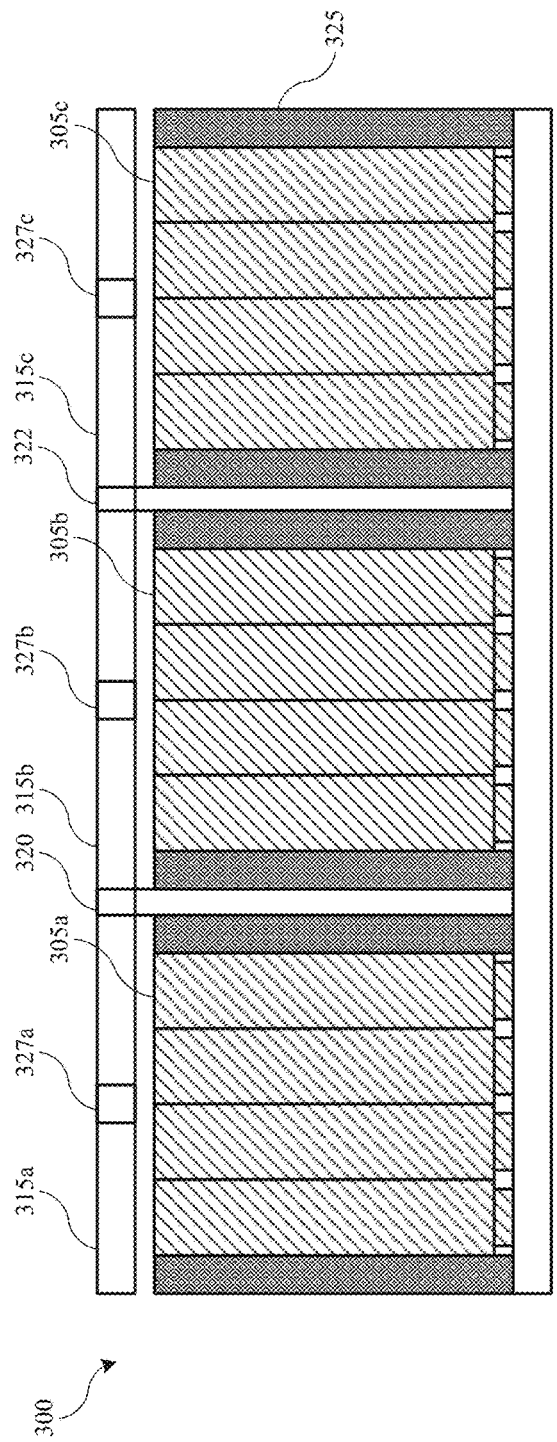
FIG. 3A shows an exemplary schematic cross-sectional view of an energy storage array according to embodiments of the present technology.
Figure 3B:
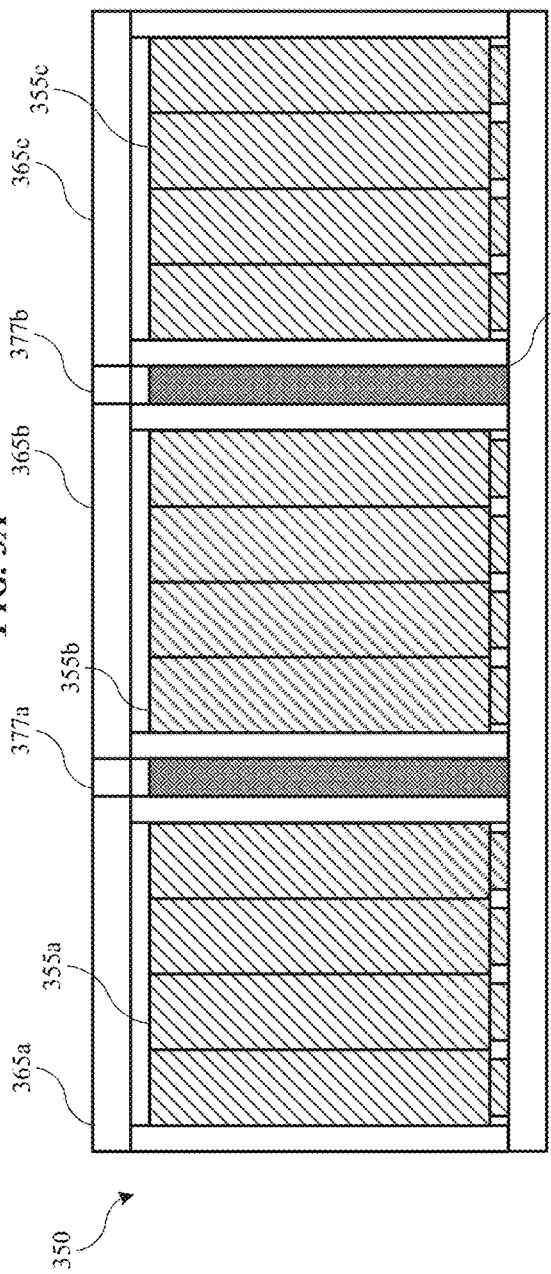
FIG. 3B shows an exemplary schematic cross-sectional view of an energy storage array according to embodiments of the present technology.

FIGS. 3A-3B show schematic cross-sectional views of energy storage arrays 300, 350 according to embodiments of the present technology. Energy storage arrays 300, 350 may include a plurality of energy storage devices discussed above with regard to FIG. 1, for example. As illustrated in FIG. 3A each cell block 305a-c may be disposed within a housing 315a-c, or within a portion of housing 315. Partition walls 320, 322 may separate the cells, and may include one wall, two partition walls, each associated with an individual cell block 305, and amount of insulation, or other components of the system. Each cell block is illustrated with a plurality of battery cells, which may be any number of cells as previously discussed. As illustrated, each cell block housing 315 may include fluid delivery manifolds 325 on opposite sides of the cell. The fluid delivery manifolds may include any of the characteristics or configurations previously described.

Each housing 315 may also include an entry port 327a-c for delivery of a fluid to each of the fluid delivery manifolds 325. Once delivered within a housing via entry port 327, a fluid may be distributed via piping or another mechanism to the individual fluid delivery manifolds 325. FIG. 3B includes an additional array 350 having a configuration of shared manifolds. Energy storage array 350 may also include a number of cell blocks 355a-c. Although both FIGS. 3A and 3B illustrate three cell blocks, it is to be understood that an energy storage array according to the present technology may include any number of cell blocks in any number of rows and columns. Cell blocks 355 may be included within housing 365a-c, which enclose the cell blocks. In this configuration, fluid delivery manifolds 375 may be positioned between adjacent cell blocks and housings. In this way, cell blocks may share a fluid delivery manifold. Additionally, entry ports 377a-b may be positioned in line with the fluid delivery manifolds 375 for more direct delivery of fluid. It is to be understood that the configurations illustrated are only examples of possible configurations of the present technology. Different configurations are also possible, as well as additional components including insulation, piping, sensors, and any number of other components useful for such arrays, and are encompassed by the present technology.

Figure 4:
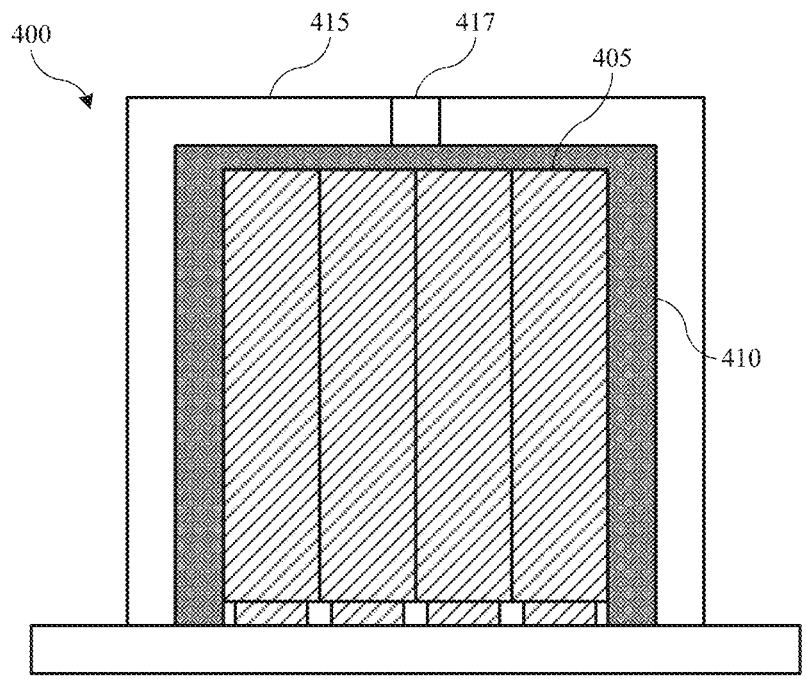
FIG. 4 shows an exemplary schematic cross-sectional view of an energy storage system according to embodiments of the present technology.

Turning to FIG. 4 is shown a schematic cross-sectional view of an energy storage system 400 according to embodiments of the present technology. FIG. 4 may include a number of similar components as FIG. 1 discussed previously, and may include any component or parameter discussed above with regard to that figure. For example, energy storage system 400 may include a cell block 405 including a plurality of battery cells. As noted, the cells may be oriented as illustrated, or may be rotated, flipped, or otherwise included in any other orientation. As illustrated, cell block 405 may be characterized by a top and a number of sides. The number of sides may be determined based on the specific configuration, which may have any number of geometries. In embodiments, the cell block may be rectangular, and may have, for example, four sides. Different geometries may have more or less sides in different embodiments. Cell block 400 may also include a housing 415 including a fluid port 417 for delivery of a fluid as previously discussed.

Energy storage system 400 may also include a structure 410, which may be coupled with the cell block. Structure 410 may be coupled with a top of cell block 405, and may also be coupled with at least one side of the cell block. The structure 410 may be configured to distribute a fluid substantially uniformly through the structure from the fluid port 417. In embodiments, the structure 410 may include pores, capillaries, or an ordered or unordered structure that may allow distribution of fluid through the structure. The structure 410 may include separate sheets or portions of the material coupled to or with surfaces of the cell block 405, or in some embodiments the structure 410 may be a continuous arrangement extending across the top and side of the cell block 405. The structure 410 may be contained within the housing in contact with the cell block 405.

In operation, a fluid may be delivered through fluid port 417 to contact structure 410. The structure may absorb the fluid at a particular rate, and may distribute the fluid through the structure. In some embodiments a barrier, such as a fluid barrier may be positioned between the cell block 405 and the structure 410 to maintain a liquid separation between the two components. In some embodiments, the structure 410 may be a material sheet that extends from one side of the cell block, across the top of the cell block, and across a second side of the cell block opposite the first as illustrated. Additionally, the material may further cover other sides, such as a front and back of a four-sided cell block. Accordingly, in some embodiments the structure 410 may partially or completely cover one or more surfaces of the cell block, and may, for example, cover all exposed surfaces of the cell block within the housing 415.

Figure 5A:
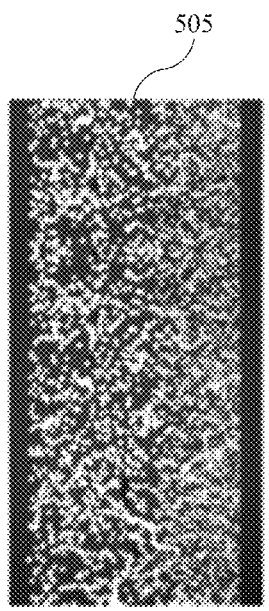
FIG. 5A shows an image of an exemplary fluid distribution structure according to embodiments of the present technology.
Figure 5B:
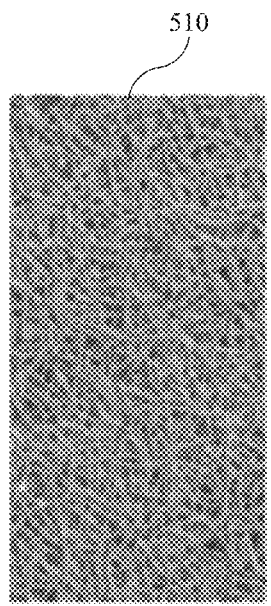
FIG. 5B shows an image of an exemplary fluid distribution structure according to embodiments of the present technology.
Figure 5C:
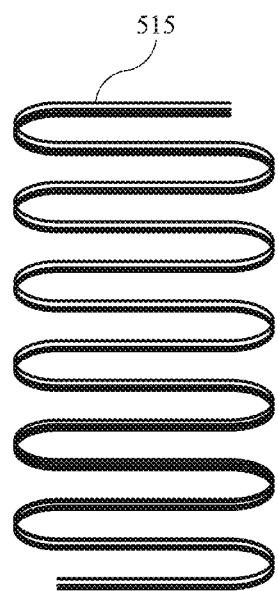
FIG. 5C shows an exemplary schematic fluid distribution structure according to embodiments of the present technology.

FIGS. 5A-5C illustrate exemplary material structures that may be used in potential structures 410. FIG. 5A shows an image of a fluid distribution structure 505 according to embodiments of the present technology. As illustrated, the fluid distribution structure 505 may include an ordered arrangement of fibers, which may be a mesh, or other connected structure providing directed fluid paths through the structure. The paths may allow a liquid contacting the structure to be drawn through the structure in all directions. In embodiments the fluid may be drawn in some directions faster than other directions, such as across the structure faster than through the structure, although in some embodiments the fluid may be drawn uniformly or substantially uniformly through the structure in all directions.

FIG. 5B shows an image of a fluid distribution structure 510 according to embodiments of the present technology. As illustrated, the structure may be an unordered mesh, such as a woven material that may distribute fluid in any of the ways as discussed above. Additionally, FIG. 5C shows a schematic fluid distribution structure 515 according to embodiments of the present technology. The structure 515 may include a pleated structure, such as with accordion pleats or folds as shown. The structure may be a number of layered materials that are then folded, or distributed in an arrangement for advantageous fluid distribution. For example, structure 515 may have layers that allow distribution between or across the layers at a particular rate, while each layer allows distribution through the layer at a rate that may be similar or different from the distribution rate across or between the layers. In some embodiments, the structure may have a combination of characteristics, such as layers of one or both of structures 505, 510 that may then be incorporated in an arrangement such as illustrated with structure 515. It is to be understood that FIGS. 5A-5C are merely examples of structures that may be used in the present technology, and many other structures, patterns, or arrangements are also available that are similarly encompassed by the present technology, and may provide the other characteristics discussed elsewhere.

The material used, in addition to the structures illustrated, may be composed of or include a number of materials. For example, the materials may include metal, fabrics, polymeric materials, or any combination to provide particular structural, thermal, or electrical characteristics. For example, polymeric or fabric materials may be used to reduce electrical conductivity through the structure, while a metal material may be used or included to provide rigidity and heat transfer capabilities. Accordingly, the materials may be selected or combined to accommodate several characteristics.

In embodiments, the structure may be configured to conduct liquid at a certain rate through or across the structure. As explained previously, the liquid may be flowed at a rate to maintain the liquid within the structure until sufficient heat is absorbed, while distributing the fluid throughout the structure to limit or prevent dry areas of the structure. The structure may be configured to maintain the liquid within the structure until it evaporates in some embodiments. The rate of flow through the structure may be up to, greater than, or about 20 mL/min. This rate may be one or both of a delivery rate to the material or a distribution rate through the material. In some embodiments, either rate may be greater than or about 30 mL/min, greater than or about 40 mL/min, greater than or about 50 mL/min, greater than or about 60 mL/min, greater than or about 70 mL/min, greater than or about 80 mL/min, greater than or about 90 mL/min, greater than or about 100 mL/min, greater than or about 110 mL/min, greater than or about 120 mL/min, greater than or about 130 mL/min, greater than or about 140 mL/min, greater than or about 150 mL/min, greater than or about 160 mL/min, greater than or about 170 mL/min, greater than or about 180 mL/min, greater than or about 190 mL/min, greater than or about 200 mL/min, or greater depending on the size of the structure through which distribution is desired, the flow rate to the structure, or the amount of heat being generated or received in any unit of time.

The structure may be characterized by any of the dimensions previously discussed. In embodiments the structure may have a uniform thickness across the structure, and in some embodiments the thickness of the structure may vary across the length or width of the structure. For example, the structure may be thicker along sides of the cell block and thinner across the top of the cell block in embodiments. This may, for example, provide fluid more quickly to the side portions from a fluid port. Additionally, because of the absorbent nature of the material used in the structure, which may provide multi-directional simultaneous distribution, the fluid port may not necessarily be on the top of the cell block or cell block housing. For example, the fluid port may be on any surface of the housing, or facing any surface of the cell block in embodiments.

The material used in the structure may also be characterized by any of the flow, compression, or temperature capabilities previously described. For example, the material may be configured to maintain a substantially uniform fluid distribution through the structure under a compressive force greater than or about 100 kPa. Such an ability may be aided by the material of the structure, which may be capable of distributing fluid in any direction, which may enable more circuitous flow, such as around or about compressed regions of the structure. Additionally, the structure may include a material configured to withstand temperatures greater than or about 100° C. in embodiments, which may allow a fluid, such as any of the fluids previously described, to evaporate within the structure. The material may be fabricated to direct evaporated fluid in a particular direction. Additionally, pressure drops across the structure may direct evaporated material away from the structure and out of the housing in any number of ways, such as through vents in any surface of the housing, such as through the bottom of the housing. Different materials, configurations, deliveries, and flow patterns will be readily appreciated from the examples discussed, and are similarly encompassed by the present technology.

Figure 6:
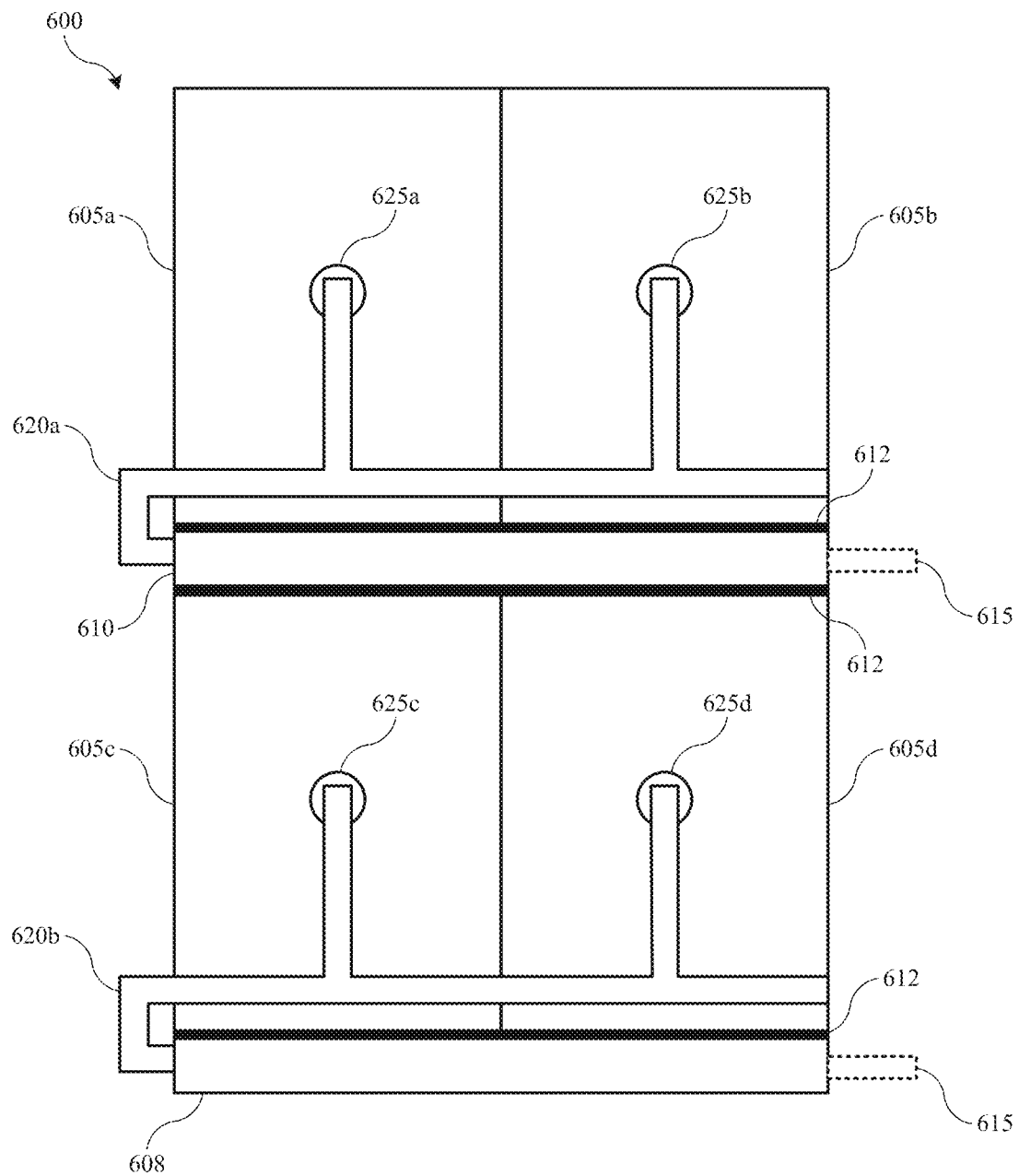
FIG. 6 shows an exemplary schematic top plan view of an energy storage array according to embodiments of the present technology.

The fluid delivered to or used with any of the manifolds or delivery structures discussed previously may be provided from a number of locations. For example, a reservoir may be located in communication with the cell blocks for delivery upon event sensing. Additionally, in some embodiments the fluid may be delivered from a different fluid system, which may reduce the space requirement for a separate fluid reservoir. One type of fluid system is illustrated with FIG. 6, which shows an exemplary schematic top plan view of an energy storage array 600 according to embodiments of the present technology.

Energy storage system array 600 may include one or more cell blocks, such as cell blocks 605a-d. Each cell block 605 may be similar to any of the cell blocks previously described, including cell blocks of FIGS. 1 and 4, for example. Although four cell blocks are shown in the illustration, the number of cell blocks may be greater or smaller, and may include tens, hundreds, or more cell blocks, which may each include any number of individual cells. The system may also include heat exchangers 608, 610 positioned between the cell blocks, such as between cell block rows. Although two heat exchangers are shown, the system may include a single heat exchanger, or multiple heat exchangers for each row of cell blocks in other embodiments. Heat exchangers 608, 610 may be coupled with a surface of the cell blocks, or be in thermal communication with the cell blocks in exemplary arrangements. The system may include thermal interface materials 612 between the heat exchangers and the cell blocks, which may enhance thermal communication between the components in different embodiments. Any number of known thermal interface materials, epoxies, or structures may be used. In some embodiments a single heat exchanger may be associated with a row of cell blocks. Additionally, in some embodiments, a first heat exchanger, such as heat exchanger 608, may be coupled with or be in thermal communication with a first surface of one or more cell blocks, and a second heat exchanger, such as heat exchanger 610, may be coupled with or be in thermal communication with a second surface of the one or more cell blocks.

Heat exchangers 608, 610 may be configured to circulate a heat exchange fluid along the cell blocks 605 or proximate the cell blocks or a surface of the cell blocks in some embodiments. The heat exchange fluid may receive a heat load from the cell blocks during normal operation. Even under normal conditions, the cell blocks may generate a certain amount of heat, that may be removed from the system by the heat exchangers 608, 610. The heat exchangers may then circulate the fluid to a secondary position to reject the heat load from the heat exchange fluid. Although not fully shown, optional distributers 615 may distribute the heat exchange fluid to another component to reject the load. The component may be another heat exchanger utilizing another fluid for the rejection, or may be a separate component that removes the heat load from the heat exchange fluid. For example, a cooling tower, outdoor unit, radiator, or other convective unit may force a fluid over the distributers 615 to remove heat from the heat exchange fluid. In embodiments, the heat exchangers 608, 610 may be part of a heat transfer loop that may include one or more pumps, expansion devices, or other ancillary components. The fluid within the heat exchangers 608, 610 may be circulated at a first pressure, in embodiments through a heat exchange loop, which may be a closed or open heat exchange loop. The first pressure may be a particular pressure, or may be a pressure range from about atmospheric pressure up to a threshold pressure discussed below.

The energy storage system array 600 may also include a distribution assembly that may access the fluid from the heat exchangers under particular conditions. The distribution assembly may include a valve incorporated with the heat exchanger, discussed further below, which may allow fluid from the heat exchanger to be distributed to piping 620*a-b*. The piping may be coupled with the valve, and may extend to an entrance port 625*a-d* associated with each cell block. The entrance port may distribute the fluid to a fluid delivery apparatus within housing of the cell block as previously described. The fluid delivery apparatus may be a fluid delivery manifold as discussed previously, or may be a structure configured to distribute a fluid substantially uniformly through the structure from the entrance port 615. These may be any of the structures discussed with reference to any of the previous figures. The fluid delivery apparatuses may be positioned within the cell block on one or more surfaces that are not in communication with the heat exchanges 608, 610, such as surfaces adjacent to a neighboring cell block 605. Additionally, different array structures such as illustrated in FIG. 3 may be utilized similarly with the delivery system of FIG. 6.

FIG. 7A shows an exemplary partial side view of a possible heat exchanger 700 and a distribution assembly according to embodiments of the present technology, and may be a side view of the array 600 discussed above. As shown, heat exchanger 700 may be an elongate structure that may extend across a surface of one or more cells, cell surfaces, or cell blocks. The heat exchanger 700 may include a valve or valve assembly 710 incorporated with the heat exchanger to provide access to a fluid distributed through heat exchanger 700. Once accessed, the fluid may be distributed to piping 720, which may connect or distribute to fluid ports 625 discussed above. FIG. 7B shows an exemplary partial cross-sectional view of heat exchanger 700 and a distribution assembly according to embodiments of the present technology. As illustrated, the cut-away portion shows an exemplary fluid path through the heat exchanger, which may circulate a fluid from top to bottom, or from bottom to top, with a turn proximate the valve assembly 710. Additionally, an amount of piping may be included with one or more passes across the surfaces of the cell blocks in some embodiments, as well as other heat exchanger designs that may allow heat to be transferred as discussed above. The heat exchanger may be or include any number of materials, such as metal, polymer, or other materials. In some embodiments, piping 720 may not be separate from heat exchanger 700 as illustrated, and may not include piping. For example, a channel may be formed within a portion of the heat exchanger that extends similarly to the piping, but as part of the elongate structure, such as a defined region within the structure. The heat exchanger may be extended in multiple directions, such that a channel may be defined opposite the valve assembly 710, which then directs fluid through the channel to additional piping or channels along an adjacent surface of the cell blocks.

An example of the operation of the device may assist in further understanding the present technology. Under normal operation, heat generated by the cell blocks, or constituent cells, may be transferred to the heat exchange fluid within the heat exchanger. The heat exchanger may circulate or provide a path for circulation of the fluid away from the cell blocks, and towards a secondary heat exchange position, where the heat load may be rejected in any number of ways. During normal operation, or within predetermined operating conditions, the valve assembly 710 may remain closed, maintaining the fluid within the heat exchanger 700 and associated loop.

Upon an event, such as any of the heat-generating events discussed elsewhere, the heat generated by a particular cell may begin to increase, and may increase dramatically in some embodiments. This heat may further heat the fluid within the heat exchanger 700, which may raise the fluid pressure within the heat exchanger as well. Depending on the amount of temperature or pressure increase, the conditions may exceed a design threshold to activate the valve assembly 710. Valve assembly 710 may be configured to operate within a particular temperature or pressure range, which when exceeded, may open the valve. For example, a component of the valve assembly may break or release at a particular temperature or pressure, which may activate or temporarily open the valve. Once opened, the heat exchange fluid may enter piping 720, or an integrated channel as discussed above, as well as a combination of an integrated channel and piping, and flow towards the cell blocks. The fluid may be delivered into the entrance ports of the cell blocks, and utilized by any of the apparatuses discussed above. This may prevent the generated heat from transferring to neighboring cells as discussed previously.

The pressure or temperature may be predetermined, and the release temperature or pressure for the valve may be set accordingly. For example, the valve assembly 710 may be set to release at a temperature of 3° C. or more from standard operating conditions, such as greater than or about 5° C. above standard operating conditions, as well as at temperatures above standard operating conditions greater than or about 10° C., greater than or about 20° C., greater than or about 30° C., greater than or about 40° C., greater than or about 50° C., greater than or about 60° C., greater than or about 70° C., greater than or about 80° C., greater than or about 90° C., greater than or about 100° C., or more. Additionally the valve may be a pressure-release valve, which may be set to release at a pressure above normal operating conditions of about 20 kPa, or the valve may be set to release at a pressure above normal operating conditions greater than or about 30 kPA, greater than or about 40 kPA, greater than or about 50 kPA, greater than or about 60 kPA, greater than or about 70 kPA, greater than or about 80 kPA, greater than or about 90 kPA, greater than or about 100 kPA, or higher. The set point may be any of the values discussed, although an intermediate value may allow the fluid to be accessed early enough to limit heat transfer to neighboring cells, but high enough to reduce or limit false tripping during normal operations.

Additional components may be incorporated within the system to allow delivery of heat exchange fluid to a limited number of cells, such as only the cells or cell block undergoing a heat-generating event. For example, a temperature-sensitive material may be used as a plug in the entrance port 625 of the cell block in some embodiments. The material may or may not be hermetic like the valve assembly discussed above. In embodiments, the material may be or include plastics, wax, solder, metal alloys or other metals, and may be configured to melt or release at a determined temperature. As the temperature within the cell block rises, the material may melt or dissipate to provide access to the cell block for the incoming fluid, which has been released into the fluid piping. While the plug may dissipate within the target cell block, the other plugs associated with additional cells may be maintained, which may prevent access to those cell blocks. Accordingly, a limited amount of heat exchange fluid may be used, and provided only where needed, such as to the cell block undergoing the event.

FIGS. 8A-8B show exemplary expanded cross-sectional views of a distribution assembly according to embodiments of the present technology. As shown in FIG. 8A, a valve assembly 810 and fluid piping 820 may be incorporated with a heat exchanger such as previously described. The valve assembly 810 may include a valve 830, which may block a fluid entrance port 840 from the heat exchanger. The valve 830 may be a pressure-release valve configured to open at a threshold pressure to allow heat exchange fluid to flow into the piping. The threshold pressure may be any of the pressures previously described, and may be any of the ranges above normal operating conditions discussed elsewhere. The valve 830 may include a loaded device, such as a retaining spring 850 or other material to regulate when the valve opens. Although valve 830 is discussed as a pressure-release valve, a temperature-release valve may also be used in embodiments as would be readily appreciated. Similarly, other structures including freeze-plugs, leaf springs, coils, bevels, hinges, and other materials may be utilized.

Once the threshold pressure has been reached or exceeded, the valve may open as illustrated in FIG. 8B. An adequate pressure, such as a fluid pressure, may overcome the retaining spring 850, which may modulate valve 830. The recessed valve 830 may provide access to fluid port 840 as well as fluid piping 820. The heat exchange fluid may then flow through the piping 820 to a cell block, such as a cell block undergoing a heat-generating event. By utilizing the heat exchange fluid of heat exchanger 700, an additional fluid reservoir may not be needed, which may reduce an overall system footprint. In embodiments the valve may be resettable or non-resettable. For example, certain release valves may close once the pressure reduces below the threshold pressure to trigger release.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. An energy storage system comprising:
   a cell block having at least one battery cell;
   a first heat exchanger coupled with a surface of the cell block and configured to circulate a heat exchange fluid proximate the surface of the cell block to receive a heat load from the battery cell and to discharge the heat load from the heat exchange fluid at a secondary heat exchange position, wherein the first heat exchanger operates at a fluid pressure; and
   a second heat exchanger coupled with a surface of the cell block and arranged to receive the heat exchange fluid via a valve that opens when the fluid pressure exceeds a threshold pressure.

2. The energy storage system of claim 1, wherein the valve comprises a temperature-release valve configured to open at a threshold temperature.

3. The energy storage system of claim 1, wherein the fluid pressure comprises a pressure range from about atmospheric pressure to the threshold pressure.

4. The energy storage system of claim 1, wherein the second heat exchanger has an entrance port comprising a heat-sensitive plug configured to release at a threshold temperature associated with the threshold pressure.

5. The energy storage system of claim 1, wherein the cell block comprises a housing containing the at least one battery cell and a fluid delivery apparatus fluidly coupled with an entrance port that receives the heat exchange fluid.

6. The energy storage system of claim 5, wherein the fluid delivery apparatus comprises a manifold or a structure configured to distribute a fluid substantially uniformly through the cell block from the entrance port.

7. The energy storage system of claim 1, further comprising an array of cell blocks including a first cell block having a first surface coupled with the first heat exchanger, and wherein the second heat exchanger is coupled with a second surface of the cell block opposite the first surface of the cell block.

8. The energy storage system of claim 1, further comprising a thermal interface material positioned between the surface of the cell block and the first heat exchanger.

9. A battery system comprising:
   a battery cell;
   a first heat exchanger in contact with a first surface of the battery cell;
   a second heat exchanger in contact with a second surface of the battery cell;
   a fluid disposed within the first heat exchanger; and
   a valve fluidly coupled between the first heat exchanger and the second heat exchanger, the valve configured to open and release at least some of the fluid to the second heat exchanger when at least one characteristic of the fluid exceeds a predetermined threshold.

10. The battery system of claim 9 wherein the at least one characteristic of the fluid is a temperature of the fluid and the predetermined threshold is a predetermined threshold temperature of the fluid.

11. The battery system of claim 9 wherein the at least one characteristic of the fluid is a pressure of the fluid and the predetermined threshold is a predetermined threshold pressure of the fluid.

12. The battery system of claim 9 wherein the battery cell is a first battery cell and the battery system further comprises a second battery cell positioned adjacent the first battery cell.

13. The battery system of claim 9 wherein the battery cell and the first heat exchanger are positioned within a housing.

14. The battery system of claim 13 wherein the second heat exchanger is positioned outside of the housing.

* * * * *